US009572060B2

(12) United States Patent
von Elbwart et al.

(10) Patent No.: US 9,572,060 B2
(45) Date of Patent: Feb. 14, 2017

(54) CHANNEL STATE INFORMATION REPORTING FOR COMPONENT CARRIERS FOR WHICH NO CHANNEL STATE INFORMATION WAS CALCULATED

(75) Inventors: Alexander Golitschek Edler von Elbwart, Langen (DE); Michael Einhaus, Langen (DE)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 366 days.

(21) Appl. No.: 13/978,073

(22) PCT Filed: Dec. 20, 2011

(86) PCT No.: PCT/EP2011/006447
§ 371 (c)(1),
(2), (4) Date: Aug. 8, 2013

(87) PCT Pub. No.: WO2012/095147
PCT Pub. Date: Jul. 19, 2012

(65) Prior Publication Data
US 2014/0003269 A1 Jan. 2, 2014

(30) Foreign Application Priority Data
Jan. 10, 2011 (EP) .................... 11000119

(51) Int. Cl.
*H04W 24/10* (2009.01)
*H04L 5/00* (2006.01)
(52) U.S. Cl.
CPC .............. *H04W 24/10* (2013.01); *H04L 5/003* (2013.01)
(58) Field of Classification Search
CPC ...... H04W 24/10; H04W 28/06; H04W 28/04; H04W 72/00; H04W 72/1231; H04W 72/08; H04W 72/085; H04W 56/00; H04W 56/0005; H04W 56/0045; H04W 8/24; H04L 5/003; H04L 5/00; H04L 5/0057; H04L 5/0007; H04L 5/001; H04L 1/0028; H04L 1/0027; H04L 1/0026; H04L 1/0031; H04L 1/1812; H04L 1/1671; H04L 12/26
(Continued)

(56) References Cited

U.S. PATENT DOCUMENTS

2002/0045458 A1 * 4/2002 Parantainen .......... H04W 40/00
   455/466
2003/0152030 A1   8/2003 Hershey
(Continued)

FOREIGN PATENT DOCUMENTS

EP   1376950 A1   1/2004
EP   2 230 786 A1   9/2010
(Continued)

OTHER PUBLICATIONS

3rd Generation Partnership Project; Technical Specification Group Radio Access Network; Radio Resource Control (RRC); Protocol Specification (Release 9), 3GPP Standard; 3GPP TS 25.331, 3GPP, Mobile competence Centre; 650, Route Des Lucioles; F-06921 Sophia-Antipolis Cedex; France, No. V9.0.0, Sep. 1, 2009, pp. 1-1710, XP050368029.
(Continued)

*Primary Examiner* — Andrew Chriss
*Assistant Examiner* — Rasha Fayed
(74) *Attorney, Agent, or Firm* — Pearne & Gordon LLP

(57) ABSTRACT

The invention relates to a method for reporting channel state information from a user equipment (UE) to a eNodeB. In particular, the channel state information report is generated for all component carriers configured by the UE, indepen-
(Continued)

dent from whether channel state information was actually calculated or not. If no channel state information is calculated for a specific component carrier, then the channel state information encodes information as to the status of said specific component carrier and thus the reason why no channel state information calculation was performed. For instance, the channel state information may encode that the status of the component carrier is deactivated, allowing the base station to check whether a component carrier is indeed activated or deactivated at the UE side.

14 Claims, 6 Drawing Sheets

(58) Field of Classification Search
USPC .......................................... 370/252, 328, 329
See application file for complete search history.

(56) References Cited

U.S. PATENT DOCUMENTS

| | | | |
|---|---|---|---|
| 2006/0223449 A1* | 10/2006 | Sampath | H04L 1/0026 455/69 |
| 2007/0296616 A1* | 12/2007 | Lim | H04L 27/2608 341/81 |
| 2009/0028260 A1* | 1/2009 | Xiao | H04L 1/0026 375/260 |
| 2009/0028819 A1* | 1/2009 | Carter | A61K 31/675 424/85.2 |
| 2010/0099443 A1 | 4/2010 | King et al. | |
| 2011/0134771 A1* | 6/2011 | Chen | H04L 1/0027 370/252 |
| 2011/0243048 A1* | 10/2011 | Wang | H04L 5/0051 370/311 |
| 2011/0269490 A1* | 11/2011 | Earnshaw | H04L 1/0026 455/509 |
| 2012/0039252 A1* | 2/2012 | Damnjanovic | H04L 1/0026 370/328 |

FOREIGN PATENT DOCUMENTS

| | | |
|---|---|---|
| JP | 2012-520643 A | 9/2012 |
| JP | 2013-534740 A | 9/2013 |
| WO | 99/18742 A1 | 4/1999 |
| WO | 2005/022781 A1 | 3/2005 |
| WO | 2009/121023 A1 | 10/2009 |
| WO | 2010-105653 A2 | 9/2010 |
| WO | 2010/143821 A2 | 12/2010 |
| WO | 2011/099774 A2 | 8/2011 |
| WO | 2011-150965 A1 | 12/2011 |

OTHER PUBLICATIONS

3rd Generation Partnership Project; Technical Specification Group Core Network and Terminals; Point-to-Point (PP) Short Message Service (SMS) support on mobile radio interface (Release 9), 3GPP Standard; 3GPP TS 24.011, 3GPP, Mobile Competence Centre; 650, Route Des Lucioles; F-06921 Sophia-Antipolis Cedex; France, No. V9.0.0, Dec. 14, 2009, pp. 1-108, XP050400797.
3rd Generation Partnership Project; Technical Specification Group Radio Access Network; Evolved Universal Terrestrial Radio Access Network (E-UTRAN); S1 Application Protocol (S1AP) (Release 10), 3GPP Standard; 3GPP TS 36.413, 3GPP, Mobile Competence Centre; 650, Route Des Lucioles; F-06921 Sophia-Antipolis Cedex; France, No. V10.0.1, Jan. 5, 2011, pp. 1-250, XP050462529.
Kaaranen H et al: UMTS Networks, Architecture, Mobility and Services Passage, UMTS Networks. Architecture, Mobility and Services, Wiley , US, Jan. 1, 2001, pp. 213-214-265-270, XP000002658895.
3rd Generation Partnership Project; Technical Specification Group Core Network and Terminals; Technical realization of the Short Message Service (SMS) (Release 9), 3GPP Standard; 3GPP TS 23.040, 3GPP, Mobile Competence Centre; 650, Route Des Lucioles; F-06921 Sophia-Antipolis Cedex; France, No. V9.0.0, Jun. 1, 2009, pp. 1-202, XP050362164.
3rd Generation Partnership Project; Technical Specification Group Core Network and Terminals; Non-Access-Stratum (NAS) protocol for Evolved Packet System (EPS); Stage 3 (Release 10), 3GPP Standard; 3GPP TS 24.301, 3GPP, Mobile Competence Centre; 650, Route Des Lucioles; F-06921 Sophia-Antipolis Cedex; France, No. V10.2.0, Mar. 1, 2011, pp. 1-315, XP050476784.
NTT Communicationware: Using MM sublayer for PS-SMS message transfer, 3GPP Draft, IW-99053, 3GPP, Mobile Competence Centre; 650, Route Des Lucioles; F-06921 Sophia-Anthipolis Cedex ; France, vol. CN WG1, No. Oulu; Nov. 22, 1999, Nov. 24, 1999, XP050060627, p. 8 lines 34-35.
Ericcson et al: Correction to Fast Dormancy, 3GPP Draft; R2-101726, 3GPP, Mobile Competence Centre; 650, Route Des Lucioles; F-06921 Sophia-Antipolis Cedex; France, vol. RAN WG2, No. San Franscisco, USA; Feb. 22, 2010, Feb. 27, 2010, XP050422143, p. 5, paragraph 8.1.14.4.
Nokia: Delayed Transition from DCH/DCH to RACH/FACH substate, 3GPP Draft; R2-99889, 3GPP, Mobile Competence Centre; 650, Route Des Lucioles; F-06921 Sophia-Antipolis Cedex; France, vol. RAN WG2, No. Sophia Antipolis; Aug. 17, 1999, Aug. 17, 1999, XP050113190, p. 1, paragraph 2.
3rd Generation Partnership Project; Technical Specification Group Services and Systems Aspects; General Packet Radio Service (GPRS) enhancements for Evolved Universal Terrestrial Radio Access Network (E-UTRAN) access (Release 10), 3GPP Standard; 3GPP TS 23.401, 3GPP, Mobile Competence Centre; 650, Route Des Lucioles; F-06921 Sophia-Antipolis Cedex; France, No. V10. 3.0, Mar. 18, 2011, pp. 1-278, XP050476358.
Panasonic: Optimized SMS Transmission over NAS Connection, 3GPP Draft; S2-113304_SIMTC_SMS_Transport_V0-3, 3rd Generation Partnership Project (3GPP), Mobile Competence Centre; 650, Route Des Lucioles; F-06921 Sophia-Antipolis Cedex; France, vol. SA WG2, No. Naantali; Jul. 11, 2011, Jul. 5, 2011, XP050548590.
Extended European Search Report for Application Number 11171561.1-1249 dated May 23, 2012.
Extended European Search Report for Application Number 11002842.0-1249 dated Oct. 12, 2011.
International Search Report for PCT International Application Number PCT/EP2012/000789 dated May 10, 2012.
3rd Generation Partnership Project; Technical Specification Group Services and System Aspects; General Packet Radio Service (GPRS) enhancements for Evolved Universal Terrestrial Radio Acceess Network (E-UTRAN) access (Release 11), 3GPP Standard; 3GPP TS 23.401, No. V11.1.0, Mar. 2012, XP002675861.
3rd Generation Partnership Project; Technical Specification Group Core Network and Terminals; Technical realization of the Short Message Service (SMS) (Release 10), 3GPP Standard; 3GPP TS 23.040, No. V10.0.0, Mar. 2011, XP050476761.
Panasonic: Optimized SMS Transmission over NAS Signaling, 3GPP Draft; S2-112501, vol. SA WG2, Meeting # 85, Xi'An; May 16-20, 2011, XP050525490.
International Search Report for PCT/EP2011/006447 Jan. 30, 2012.
Yuanye Wang et al "Downlink Transmission in Multi-Carrier Systems with Reduced Feedback" 2010 IEEE Vehicular Technology Conference (VTC 2010-Spring) May 16-19, 2010; Taipei, Taiwan, IEEE, US, May 16, 2010, pp. 1-5.
Texas Instruments "CQI Feedback Reduction Scheme for E-UTRA" 3GPP Draft; R1-074153 TI CQI Feedback, 3rd Generation Partnership Project (3GPP); Mobile Competence Centre, 650 Route des Lucioles, F-06921, Sophia-Antipolis Cedex, France; vol. RAN WG1, No. Shanghai, China; Oct. 2, 2007.
Yuanye Wang et al "Uplink Overhead Analysis and Outage Protection for Multi-Carrier LTE-Advanced Systems" Personal, Indoor and Mobile Radio Communications Symposium 2009; IEEE Conference Proceedings; Tokyo, Japan. Sep. 14, 2009; pp. 1-5.

(56) References Cited

OTHER PUBLICATIONS

"Aperiodic CSI reports size mismatch issue", 3GPP TSG-RAN WG1 Meeting 63bis, Jan. 17-21, 2011, R1-110199, Dublin, Ireland.
"Aperiodic CSI reports size mismatch issue", 3GPP TSG-RAN WG1 Meeting 64, Feb. 21-25, 2011, R1-110768, Taipei, Taiwan.
Notice of Reason for Rejection for 2013-547816 dated Sep. 15, 2015.

* cited by examiner

CSI feedback on uplink data channel

CSI feedback on uplink data channel

CHANNEL STATE INFORMATION REPORTING FOR COMPONENT CARRIERS FOR WHICH NO CHANNEL STATE INFORMATION WAS CALCULATED

FIELD OF THE INVENTION

The invention relates to a method for reporting channel state information for component carriers in a communication system, to a corresponding channel state information message and apparatuses for performing said method.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs.

Component Carrier Structure in LTE

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols thus each consist of a number of modulation symbols transmitted on respective $N_{RB}^{DL} \times N_{sc}^{RE}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RE}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference).

The term "component carrier" refers to a combination of several resource blocks. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources. There is a PCell (Primary Cell) and none or several (e.g. up to four) SCells (Secondary Cells). The terms Cell and component carrier are used in the following interchangeably, since both Scells and Pcells may be seen as a component carrier. This however should not be interpreted to restrict the scope of the invention to a particular Release of the LTE standard.

When carrier aggregation is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore always consists of one PCell and zero or more SCells:
- For each SCell the usage of uplink resources by the UE in addition to the downlink ones is configurable (the number of DL SCCs configured is therefore always larger or equal to the number of UL SCCs and no SCell can be configured for usage of uplink resources only);
- From a UE viewpoint, each uplink resource only belongs to one serving cell;
- The number of serving cells that can be configured depends on the aggregation capability of the UE;
- PCell can only be changed with handover procedure (i.e. with security key change and RACH procedure);
- PCell is used for transmission of PUCCH;
- Unlike SCells, PCell cannot be de-activated;
- NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information from the SCells.

Component Carrier Activation/Deactivation

Essentially a downlink component carrier could be in one of the following three states: non-configured, configured but deactivated, configured and activated. When a downlink component carrier is configured but deactivated, the user equipment does not need to receive the corresponding PDCCH or PDSCH, nor is it required to perform CQI measurements. Conversely, when a downlink component carrier is activated, the user equipment shall be able to receive PDSCH and PDCCH (if present), and is expected to be able to perform CQI measurements. After configuration of component carriers in order to have PDCCH and PDSCH reception on a downlink component carrier, the downlink component carrier needs to be transitioned from configured but deactivated to the activated state.

For user equipment power-saving purposes, it's crucial that additional component carriers can be de-activated and activated in an efficient and fast way. With bursty data-transmission, it is imperative that additional component carriers can be activated and de-activated quickly, such that both the gains of high bit-rates can be utilized, and battery preservation can be supported.

If the UE is configured with one or more SCells, the network may activate and deactivate the configured SCells. It should be noted, that according to current Release 10, the PCell is assumed to be always activated; this is however not necessary for the present invention and might also change in the future. The UE will not monitor the PDCCH of a deactivated SCell and will not receive any downlink assignments or uplink grants associated to a deactivated SCell. Correspondingly, the UE will not transmit on the UL-SCH on a deactivated SCell. The network may activate and deactivate the SCell(s) by sending a Activation/Deactivation MAC control element. The MAC control element usually comprises a message (e.g. a bitmap) with information on the activation status of all (or the configured) component carriers. In other words, every time one or more component carriers are to be activated/deactivated, a message for all (configured) component carriers is transmitted in a MAC control element, with information on the respective desired activation status. In this way, the message does not strictly indicate whether a component carrier's activation status is toggled, but just the desired status after the message.

Furthermore, the UE maintains a sCellDeactivationTimer timer per configured SCell and deactivates the associated SCell upon its expiry. In other words, upon expiry of a pre-determined time after having received download data over a component carrier, the UE deactivates said component carrier. Consequently, the UE can deactivate the SCells independently, as the timer runs per SCell and is also reset per SCell.

The same initial timer value applies to each instance of the sCellDeactivationTimer and is configured by RRC. The configured SCells are initially deactivated upon addition and after a handover.

Channel Quality Reporting

The principle of link adaptation is fundamental to the design of a radio interface which is efficient for packet-switched data traffic. Unlike the early versions of UMTS (Universal Mobile Telecommunication System), which used fast closed-loop power control to support circuit-switched services with a roughly constant data rate, link adaptation in LTE adjusts the transmitted data rate (modulation scheme and channel coding rate) dynamically to match the prevailing radio channel capacity for each user.

For the downlink data transmissions in LTE, the eNodeB typically selects the modulation scheme and code rate (MCS) depending on a prediction of the downlink channel conditions. An important input to this selection process is the Channel State Information (CSI) feedback transmitted by the User Equipment (UE) in the uplink to the eNodeB.

Channel state information is used in a multi-user communication system, such as for example 3GPP LTE to determine the quality of channel resource(s) for one or more users. In general, in response to the CSI feedback the eNodeB can select between QPSK, 16-QAM and 64-QAM schemes and a wide range of code rates. This CSI information may be used to aid in a multi-user scheduling algorithm to assign channel resources to different users, or to adapt link parameters such as modulation scheme, coding rate or transmit power, so as to exploit the assigned channel resources to its fullest potential.

The CSI is reported for every component carrier, and, depending on the reporting mode and bandwidth, for different sets of subbands of the component carrier. A channel resource may be defined as a "resource block" as exemplary illustrated in FIG. 4 where a multi-carrier communication system, e.g. employing OFDM as for example discussed in the LTE work item of 3GPP, is assumed. More generally, it may be assumed that a resource block designates the smallest resource unit on an air interface of a mobile communication that can be assigned by a scheduler. The dimensions of a resource block may be any combination of time (e.g. time slot, sub-frame, frame, etc. for time division multiplex (TDM)), frequency (e.g. subband, carrier frequency, etc. for frequency division multiplex (FDM)), code (e.g. spreading code for code division multiplex (CDM)), antenna (e.g. Multiple Input Multiple Output (MIMO)), etc. depending on the access scheme used in the mobile communication system.

Assuming that the smallest assignable resource unit is a resource block, in the ideal case channel quality information for each and all resource blocks and each and all users should be always available. However, due to constrained capacity of the feedback channel this is most likely not feasible or even impossible. Therefore, reduction or compression techniques are required so as to reduce the channel quality feedback signalling overhead, e.g. by transmitting channel quality information only for a subset of resource blocks for a given user.

In 3GPP LTE, the smallest unit for which channel quality is reported is called a subband, which consists of multiple frequency-adjacent resource blocks.

As described before, user equipments will usually not perform and report CSI measurements on configured but deactivated downlink component carriers but only radio resource management related measurements like RSRP (Reference Signal Received Power) and RSRQ (Reference Signal Received Quality). When activating a downlink component carrier, it's important that the eNodeB acquires quickly CSI information for the newly activated component carrier(s) in order to being able to select an appropriate MCS for efficient downlink scheduling. Without CSI information the eNodeB doesn't have knowledge about the user equipment's downlink channel state and would most likely select a too aggressive or too conservative MCS for downlink data transmission, both of which would in turn lead to resource utilization inefficiency due to required retransmissions or unexploited channel capacity.

Channel State Information Feedback elements

Commonly, mobile communication systems define special control signalling that is used to convey the channel quality feedback. In 3GPP LTE, there exist three basic elements which may or may not be given as feedback for the channel quality. These channel quality elements are:

MCSI: Modulation and Coding Scheme Indicator, sometimes referred to as Channel Quality Indicator (CQI) in the LTE specification PMI: Precoding Matrix Indicator RI: Rank Indicator The MCSI suggests a modulation and coding scheme that should be used for transmission, while the PMI points to a pre-coding matrix/vector that is to be employed for spatial multiplexing and multi-antenna transmission (MIMO) using a transmission matrix rank that is given by the RI. Details about the involved reporting and transmission mechanisms are given in the following specifications to which it is referred for further reading (all documents available at http://www.3gpp.org and incorporated herein by reference):

3GPP TS 36.211, "Evolved Universal Terrestrial Radio Access (E-UTRA); Physical channels and modulation", version 10.0.0, particularly sections 6.3.3, 6.3.4, 3GPP TS 36.212, "Evolved Universal Terrestrial Radio Access (E-UTRA); Multiplexing and channel coding", version 10.0.0, particularly sections 5.2.2, 5.2.4, 5.3.3, 3GPP TS 36.213, "Evolved Universal Terrestrial Radio Access (E-UTRA); Physical layer procedures", version 10.0.1, particularly sections 7.1.7, and 7.2.

In 3GPP LTE, not all of the above identified three channel quality elements are reported at any time. The elements being actually reported depend mainly on the configured reporting mode. It should be noted that 3GPP LTE also supports the transmission of two codewords (i.e. two codewords of user data (transport blocks) may be multiplexed to and transmitted in a single sub-frame), so that feedback may be given either for one or two codewords. Some details are provided in the next sections and in Table 1 below for an exemplary scenario using a 20 MHz system bandwidth. It should be noted that this information is based on 3GPP TS 36.213, section 7.2.1 mentioned above.

The individual reporting modes for the aperiodic channel quality feedback are defined in 3GPP LTE as follows:
Reporting Mode 1-2
Contents of this report for transmission modes 1-8:
One set S MCSI value per codeword
One preferred PMI for each subband is selected
In case of transmission modes 4 or 8: One RI value
Contents of this report for transmission mode 9:
One set S MCSI value per codeword
One first preferred PMI for set S
One preferred PMI for each subband
One RI value
Reporting Mode 2-0
Contents of this report:
One set S MCSI value
Positions of M selected subbands
One MCSI value for M selected subbands (2 bits differential set S MCSI value, non-negative)
In case of transmission mode 3: One RI value
Reporting Mode 2-2
Contents of this report for transmission modes 1-8:
One set S MCSI value per codeword
One preferred PMI for set S
Positions of M selected subbands
One MCSI value for M selected subbands per codeword (2 bits differential to set S MCSI value, non-negative)
One preferred PMI for M selected subbands
In case of transmission modes 4 or 8: One RI value
Contents of this report for transmission mode 9:
One set S MCSI value per codeword
One first preferred PMI for set S
One second preferred PMI for set S
Positions of M selected subbands
One MCSI value for M selected subbands per codeword (2 bits differential to wideband MCSI value, non-negative)
One first preferred PMI for M selected subbands
One second preferred PMI for M selected subbands
In case of transmission modes other than transmission mode 4: One RI value
Reporting Mode 3-0
Contents of this report:
One set S MCSI value
One MCSI value per subband (2 bits differential to set S MCSI value)
In case of transmission mode 3: One RI value
Reporting Mode 3-1
Contents of this report for transmission modes 1-8:
One set S MCSI value per codeword
One preferred PMI for set S
One MCSI value per codeword per subband (2 bits differential to set S MCSI value)
In case of transmission modes 4 or 8: One RI value
Contents of this report for transmission mode 9:
One set S MCSI value per codeword
One first preferred PMI for set S
One second preferred PMI for set S
One MCSI value per codeword per subband (2 bits differential to set S MCSI value)
One RI value The below Table 1 discloses the amount of bits used for CSI reporting for the different Transmission Modes and Reporting Modes combinations. Whether or not the RI value is transmitted as well, is not considered in the following Table 1, i.e. the bits only cover the CSI reporting as such, MCSI (CQI) and PMI. It should be noted that for some modes detailed numbers are not yet agreed in the standard, and may thus be changed during further standardization. However, this will not have a significant impact on the invention that will be presented later on.

As mentioned above, for this table it is assumed that the component carrier has a 20 MHz bandwidth.

periodic CSI reporting only; the PUSCH is used for aperiodic reporting of the CSI, whereby the eNodeB specifically instructs the UE to send an individual CSI report embedded into a resource which is scheduled for uplink data transmission.

TABLE 1

| Transmission Mode # | Antenna port & rank indicator conditions | Reporting Mode | | | | |
|---|---|---|---|---|---|---|
| | | 1-2 | 2-0 | 3-0 | 2-2 | 3-1 |
| 1 (Single-antenna port 0) | NA | NA | 24 | 30 | NA | NA |
| 7 (if the number of PBCH antenna ports is one, single-antenna port, port; otherwise transmit diversity) | | | | | | |
| 2 (Transmit diversity) | 2TX or 4TX antenna ports | NA | 24 | 30 | NA | NA |
| 3 (Transmit Diversity if the associated rank indicator is 1, otherwise large delay CDD) | 2TX antenna ports | NA | 24 | 30 | NA | NA |
| | 4TX antenna ports | | 24 | 30 | | |
| 4 (Closed-loop spatial multiplexing) | 2TX antenna ports RI = 1 | 30 | NA | NA | 28 | 32 |
| | 2TX antenna ports RI > 1 | 21 | | | 32 | 61 |
| | 4TX antenna ports RI = 1 | 56 | | | 32 | 34 |
| | 4TX antenna ports RI > 1 | 60 | | | 38 | 64 |
| 5 (Multi-user MIMO) | 2TX antenna ports | NA | NA | NA | NA | 32 |
| | 4TX antenna ports | | | | | 34 |
| 6 (Closed-loop spatial multiplexing with single transmission layer) | 2TX antenna ports | 30 | NA | NA | 28 | 32 |
| | 4TX antenna ports | 56 | | | 32 | 34 |
| 8 | 2TX antenna ports RI = 1 | 30 | 24 | 30 | 28 | 32 |
| | 2TX antenna ports RI > 1 | 21 | | | 32 | 61 |
| | 4TX antenna ports RI = 1 | 56 | | | 32 | 34 |
| | 4TX antenna ports RI > 1 | 60 | | | 38 | 64 |
| 9 | 2TX antenna ports RI = 1 | 34 | NA | NA | 36 | 36 |
| | 2TX antenna ports RI > 1 | 25 | | | 40 | 65 |
| | 4TX antenna ports RI = 1 | 61 | | | 40 | 38 |
| | 4TX antenna ports RI > 1 | 64 | | | 46 | 68 |

For instance, in transmission mode 1 and reporting mode 3-0, the CQI reporting includes 30 bits of information. In the assumed 20 Mhz component carrier scenario, for mode 3-0 there would be 13 subbands in total (100 resource blocks in total, with 8 resource blocks per subband). For each subband a differential MCSI with 2 bits is reported back. In addition, there is a wideband MCSI with 4 bits (assuming aperiodic reporting of the CSI). Therefore, the CSI feedback is composed of 30 bits.

It should be noted that the term subband is here used so as to represent a number of resource blocks as outlined earlier, while the term set S represents generally a subset of the whole set of resource blocks in the system bandwidth. In the context of 3GPP LTE and LTE-A, the set S so far is defined to always represent the whole cell, i.e. component carrier bandwidth, a frequency range of up to 20 MHz, and is for simplicity hereafter referred to as "wideband". However, in the future the set S may as well only refer some of the resource blocks of the cell, in which case the skilled person shall pay attention to interpret the term wideband (or set S) used in connection with the embodiments of the invention broader than only "wideband" (or "set S") as such.

Aperiodic & Periodic CQI Reporting

The periodicity and frequency resolution to be used by a UE to report on the CSI are both controlled by the eNodeB. The Physical Uplink Control Channel (PUCCH) is used for In addition, in case of multiple transmit antennas at the eNodeB, CSI values(s) may be reported for a second codeword. For some downlink transmission modes, additional feedback signaling consisting of Precoding Matrix Indicators (PMI) and Rank Indications (RI) is also transmitted by the UE.

In order to acquire CSI information quickly, eNodeB can schedule aperiodic CSI by setting a CSI request bit in an uplink resource grant sent on the Physical Downlink Control Channel.

In 3GPP LTE, a simple mechanism is foreseen to trigger the so-called aperiodic channel quality feedback from the user equipment. An eNodeB in the radio access network sends a L1/L2 control signal to the user equipment to request the transmission of the so-called aperiodic CSI report (see 3GPP TS 36.212, section 5.3.3.1.1 and 3GPP TS 36.213, section 7.2.1 for details). Another possibility to trigger the provision of aperiodic channel quality feedback by the user equipments is linked to the random access procedure (see 3GPP TS 36.213, section 6.2).

Whenever a trigger for providing channel quality feedback is received by the user equipment, the user equipment subsequently transmits the channel quality feedback to the eNodeB. Commonly, the channel quality feedback (i.e. the CSI report) is multiplexed with uplink (user) data on the Physical Uplink Shared CHannel (PUSCH) resources that have been assigned to the user equipment by L1/L2 signalling by the scheduler (eNodeB). In case of carrier aggregation, the CSI report is multiplexed on those PUSCH resources that have been granted by the L1/L2 signal (i.e. the PDCCH) which triggered the channel quality feedback.

Mismatch About Component Carrier Activation Status

It is important that the eNodeB and the UE have the same understanding about which component carriers are activated and which are deactivated. Since the channel state information feedback is multiplexed with data on the PUSCH channel, care must be taken that the user equipment and the eNodeB have the same understanding about which part of an uplink transmission on the PUSCH within a sub-frame is the channel quality feedback and which part is the user data. As apparent from FIG. 5, since the size of the channel state information is variable (depending on the number of activated component carriers, reporting mode, transmission mode etc., see Table 1), the remaining data size is also variable.

If the understanding is the same on both sides, there is no problem because the eNodeB configures the reporting mode and sets the aperiodic CQI trigger, so it knows when the UE transmits the feedback and also knows the size of the channel state information and—by specification—the location of the feedback and data part within the sub-frame so that the individual parts may be recovered.

However, the assumption by the eNodeB about the size of the channel quality feedback might not correspond to the actual size transmitted by the UE. A misunderstanding in said respect may lead to various disadvantages. Since the channel state information report is assumed by the eNodeB to include more or fewer information bits than it actually has, the eNodeB will not succeed in correctly decoding the channel state information, which might lead to an inefficient resource allocation or a renewed channel quality feedback request to recover.

Furthermore, on the other hand, due to the multiplexing of feedback and data part and a possible size misunderstanding, situations may occur where CSI bits are assumed to be data bits by the eNodeB, thus corrupting the data transmission, and in particular the PUSCH HARQ buffer to which the wrong data bits were provided without noticing.

Moreover, one channel state information report may be associated with the wrong component carrier. As can be seen from FIG. 6, the channel state information may comprise information on all component carriers CoCa#1-5. The CSI information is concatenated for the activated component carriers. Assuming that component carriers #1 and #4 are deactivated by the UE without the eNodeB noticing (because of discontinued reception, DRX, described later), a CSI report by the UE would include channel state information for only component carriers #2, 3 and 5, whereas the eNodeB expects channel state information for all five component carriers. The difference in understanding is illustrated in FIG. 7. The corresponding CSI feedback comprising three CSI reports for component carriers #2, 3 and 5 is illustrate in FIG. 8.

Accordingly, when receiving the feedback information from the UE, the eNodeB might associate the first channel state information with component carrier #1, instead of #2. Correspondingly, the eNodeB would interpret the second channel state information for component carrier #2, instead of component carrier #3, and interpret the third channel state information as being for component carrier #3, though it actually is for component carrier #5. In summary, the eNodeB would interpret the channel feedback information wrongly and make wrong assumption on the channel quality of the different component carriers. In addition, it would interpret data information as channel state information for the remaining component carriers #4 and #5 in this example, since it expects more channel state information data, than was actually transmitted by the UE.

According to another example, the eNodeB transmits a MAC control element including a bitmap that effectively activates one component carrier and deactivates another component carrier. In said case, even if the MAC control element gets lost on the way to the UE, the resulting channel state information transmitted by the UE would have the same size as the one expected by the eNodeB. However, the channel state information would also be associated wrongly to component carriers.

A misunderstanding of the activation status of component carriers between the UE and the eNodeB might be the result of different circumstances.

As described above, downlink component carriers are deactivated based on a deactivation timer, which is reset for every downlink transmission. For example, the user equipments are able to go into a DRX mode when it is not receiving any control signal for a defined number of sub-frames. Depending on the UE implementation there may be cases where the UE deactivates the component carrier when entering the DRX mode (though this is no necessarily the case, and is also not important to the functioning of the present invention). The eNodeB may send a control signal, but due to erroneous reception (e.g. as a result of noise on the channel, etc.) the user equipment is not aware of the control signal and may enter DRX mode and then deactivate the corresponding component carrier. The eNodeB however believes the component carrier of the user equipment still to be in an activated mode.

For 3GPP LTE-A where LTE carrier aggregation will be most likely used, it is possible that the user equipment goes into DRX mode per LTE carrier (component carrier). Assuming the above implementation of the DRX function, the UE can be in DRX mode for some component carriers available for communication, while it is still activated for other component carriers. Since the user equipment is not receiving or processing any signals from component carriers for which the user equipment is in DRX mode, it can be assumed that no CSI is usually measured and reported for such component carriers.

The problem for CSI reporting is that the user equipment is configured to only report channel quality elements for component carriers that are activated. Therefore, if the understanding on DRX mode for the component carriers is different between the user equipment and the eNodeB (i.e. different understanding on the activated/deactivated status), the user equipment and the eNodeB will have different understandings on the content of the channel quality feedback.

The downlink component carrier activation/deactivation is also implemented by using a corresponding MAC control element procedure, in which a bitmap is transmitted to the UE. The bitmap indicates the activation/deactivation status for all component carriers. The bitmap may be received with errors or with an unexpected delay, for example due to necessary re-transmissions. In any case, on the one hand it is not clear when exactly the UE will activate/deactivate a particular component carrier, since there might be a delay of several subframes. Furthermore, in case the bitmap is received in the UE with erroneous information, some component carriers will be wrongly activated/deactivated by the UE, and the eNodeB would not be aware of this.

SUMMARY OF THE INVENTION

One object of the invention is to suggest a reporting mechanism for reporting the channel quality of at least one component carrier that mitigates one or more of the problem outlined above.

The object is solved by the subject matter of the independent claims. Advantageous embodiments of the invention are subject matters of the dependent claims.

The invention in general relates to reporting of channel state information, calculated by a user equipment, to the corresponding base station. As explained above, there is no reliable feedback mechanism for the base station to learn whether a component carrier used between the user equipment and the base station is activated or deactivated. This lack of feedback leads to possible misunderstandings as to the status of the component carriers and as a result to misunderstandings on the content of a channel state information message composed by the user equipment. In addition to an inefficient usage of resources, this may also result in data corruptions since for aperiodic channel state reporting, the channel state information is reported on an uplink grant together (multiplexed) with other user data.

One aspect of the invention is to suggest conveying channel state information for all configured component carriers, independent from whether channel state information was actually calculated for a component carrier or not. If no channel state information is calculated for a specific component carrier, then the channel state information encodes information as to the status of said specific component carrier and thus the reason why no channel state information calculation was performed. For instance, the channel state information may encode that the status of the component carrier is deactivated, allowing the base station to check whether a component carrier is indeed activated or deactivated at the UE side.

Generally, when the UE regards a component carrier as deactivated or in a DRX mode, it will not monitor such a downlink component carrier's signal, and in particular will not monitor the reference symbols which are used for channel estimation measurements. The measurement are usually used to generate a meaningful CSI report by means of calculation. Such a calculation step may typically include the conversion of measured or inter-/extrapolated data into an MCSI table. Therefore, a lack of measurement data will usually mean that the UE cannot perform a CSI calculation.

By performing the channel state reporting according to this aspect of the invention, the above-mentioned problems and shortcomings of the prior art are overcome. The channel state report has a size which is independent from whether a channel state information could be calculated or not, which has the advantage that no user data is corrupted, and the channel state information is not associated with "wrong" component carriers. Furthermore, by encoding status information in the channel state information for those component carriers for which actually no "valid" channel state information is available, the base station can check whether its understanding on which component carriers are activated or deactivated or not is correct, and may then act accordingly.

This will become clearer in connection with the embodiments of the invention explained in the detailed description.

In those data fields associated with component carriers for which no channel state information calculation has been performed, the channel state information is predetermined to encode the reason why the channel state information was not calculated.

The present invention provides a method for reporting channel state information from a user equipment to a base station in a communication system in which a plurality of component carriers are configured for communication between the base station and the user equipment. The user equipment calculates channel state information values for each component carrier, except for at least one component carrier for which the calculation of channel state information values is not performed. The user equipment prepares a channel state information message, comprising one data field for each of the plurality of configured component carriers. The data field for said at least one component carrier comprises predetermined channel state information values encoding the reason why the calculation of the channel state information values was not performed for said at least one component carrier. The remaining data fields of the channel state information message each comprise the calculated channel state information values for the associated component carriers. The user equipment transmits the channel state information message to the base station.

According to an advantageous embodiment of the invention, the reason why the calculation of the channel state information values was not performed is one of the following: the component carrier is configured but deactivated, the component carrier is configured and activated but not yet ready to perform the calculation of the channel state information values, or the calculation of the channel state information values calculation was performed but failed. The base station receiving this information can distinguish between the different cases and thus take appropriate decisions on how to further proceed.

In a further embodiment of the invention, the component carriers are respectively composed of a plurality of subbands. The channel state information values comprise a Modulation and Coding Scheme Index (MCSI) value for all subbands and one offset value for each of the subbands. The MCSI value and each offset value are combined to indicate the effective MCSI value for each subband. The predetermined channel state information values for the at least one component carrier comprise an MCSI value and offset values for the subbands defined such that the effective MCSI value for at least one subband is outside a range of valid MCSI values.

With regard to an alternative embodiment of the invention, the component carriers are respectively composed of a plurality of subbands. The channel state information values comprise a Modulation and Coding Scheme Index (MCSI) value for all subbands and one offset value for a subset M of the plurality of subbands. The MCSI value and the offset value are combined to indicate the effective MCSI value for the subset M of subbands. The predetermined channel state information values comprise an MCSI value and an offset value for the subset M of subbands defined such that the effective MCSI value for the subset M of subbands is outside a range of valid MCSI values.

For another embodiment of the invention each different effective MCSI value outside the range of valid MCSI values indicates a different reason why the calculation of the channel state information values was not performed.

According to another embodiment of the invention, the MCSI value and the offset values for the subbands are defined such that more than one of the effective MCSI values of subbands is outside the range of valid MCSI values, for encoding more than one reason, why the calculation of the channel state information values calculation was not performed.

In a more advantageous embodiment of the invention, if a rank indicator is also reported for the channel state information values, the rank indicator for the predetermined channel state information values is set to 1. This allows to minimize the payload size of the channel state information message.

With respect to another embodiment of the invention, the rank indicator is transmitted to the base station separately from the channel state information message.

According to another alternative embodiment of the invention, the component carriers are respectively composed of a plurality of subbands. The channel state information values comprise a Modulation and Coding Scheme Index (MCSI) value for all subbands and at least one precoding matrix indicator. The at least one precoding matrix indicator of the predetermined channel state information values for the at least one component carrier is set to a predetermined value, and the MCSI value of the predetermined channel state information values is set to 0.

For another alternative embodiment of the invention, the component carriers are respectively composed of a plurality of subbands. A rank indicator is reported to the base station for the channel state information values, and the rank indicator for the predetermined channel state information values for the at least one component carrier is set to >1 such that the predetermined channel state information refers to two codewords. The predetermined channel state information values comprises one Modulation and Coding Scheme Index (MCSI) value for all subbands for each of the two codewords, and both MCSI values are set to the value indicating the worst channel quality.

In another embodiment of the invention the reporting of the channel state information is preferably aperiodic, though invention is also applicable to periodic reporting as well.

In a further embodiment of the invention, the base station has information which component carrier should be activated and deactivated. The base station receives the channel state information message, including the channel state information values for the at least one component carrier and for the remaining component carriers. The base station verifies for each configured component carrier whether the information as to which component carrier should be activated and deactivated is correct based on the channel state information values for each component carrier in the received channel state information message.

The present invention further provides a channel state information message for providing channel state information from a user terminal to a base station in a communication system in which a plurality of component carriers are configured for communication between the base station and the user equipment. The calculation of the channel state information for at least one component carrier was not performed by the user equipment. The channel state information message comprises one data field for each of the plurality of component carriers, each data field including channel state information for the corresponding component carrier. The data field for the at least one component carrier comprises predetermined channel state information values encoding the reason why the calculation of the channel state information values was not performed. The remaining data fields each comprise the channel state information values calculated by the user equipment for the associated component carriers.

In a more detailed embodiment of the invention, the component carriers are respectively composed of a plurality of subbands. The channel state information values comprise a Modulation and Coding Scheme Index (MCSI) value for all subbands and one offset value for each of the subbands. The MCSI value and each offset value are combined to indicate the effective MCSI value for each subband. The predetermined channel state information values for the at least one component carrier comprise an MCSI value and offset values for the subbands defined such that the effective MCSI value for at least one subband is outside a range of valid MCSI values.

In an alternative embodiment of the invention the component carriers are respectively composed of a plurality of subbands. The channel state information values comprise a Modulation and Coding Scheme Index (MCSI) value for all subbands and one offset value for a subset M of the plurality of subbands. The MCSI value and the offset value are combined to indicate the effective MCSI value for the subset M of subbands. The predetermined channel state information values comprise an MCSI value and an offset value for the subset M of subbands defined such that the effective MCSI value for the subset M of subbands is outside a range of valid MCSI values.

For another embodiment of the invention, each different effective MCSI value outside the range of valid MCSI values indicates a different reason why the calculation of the channel state information values was not performed.

With regard to a further embodiment of the invention, the MCSI value and the offset values for the subbands are defined such that more than one of the effective MCSI values of subbands is outside the range of valid MCSI values. By resulting in more than one non-valid value, each non-valid value can then be preconfigured to encode a different reason, why the calculation of the channel state information values calculation was not performed.

According to another embodiment of the invention, the component carriers are respectively composed of a plurality of subbands. The channel state information values comprise a Modulation and Coding Scheme Index (MCSI) value for all subbands and at least one precoding matrix indicator. At least one precoding matrix indicator of the predetermined channel state information values for the at least one component carrier is set to a predetermined value, and the MCSI value of the predetermined channel state information values is set to 0.

For another embodiment of the invention, the component carriers are respectively composed of a plurality of subbands. A rank indicator is reported by the user equipment to the base station for the channel state information values, and the rank indicator for the predetermined channel state information values for the at least one component carrier is set to >1 such that the predetermined channel state information refers to two codewords. The predetermined channel state information values comprise one Modulation and Coding Scheme Index (MCSI) value for all subbands for each of the two codewords, and both MCSI values are set to the value indicating the worst channel quality.

The present invention also provides a user equipment for reporting channel state information to a base station in a communication system in which a plurality of component carriers are configured for communication between the base station and the user equipment. The user equipment comprises a processor for calculating channel state information values for each component carrier, except for at least one component carrier for which the calculation of channel state information values is not performed. The processor further prepares a channel state information message, comprising one data field for each of the plurality of configured component carriers. The data field for said at least one component carrier comprises predetermined channel state information values encoding the reason why the calculation of the channel state information values was not performed for said at least one component carrier. The remaining data fields each comprise the calculated channel state information values for the associated component carriers. A transmitter transmits the channel state information message to the base station.

According to further embodiments of the invention, the user equipment comprises means to perform steps in accordance with the steps of the method explained above. For instance, depending on the content of the channel state information message, the user equipment shall be able to prepare the channel state information message, including the MCSI values, precoding matrix indicator as defined such that the reason why the channel state information was not calculated by the user equipment. This includes the appropriate measurements and calculations of feedback elements of the channel state information message, and also the pre-configuration of the predetermined channel state information values for said at least one component carrier for which no channel state information calculation was performed.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
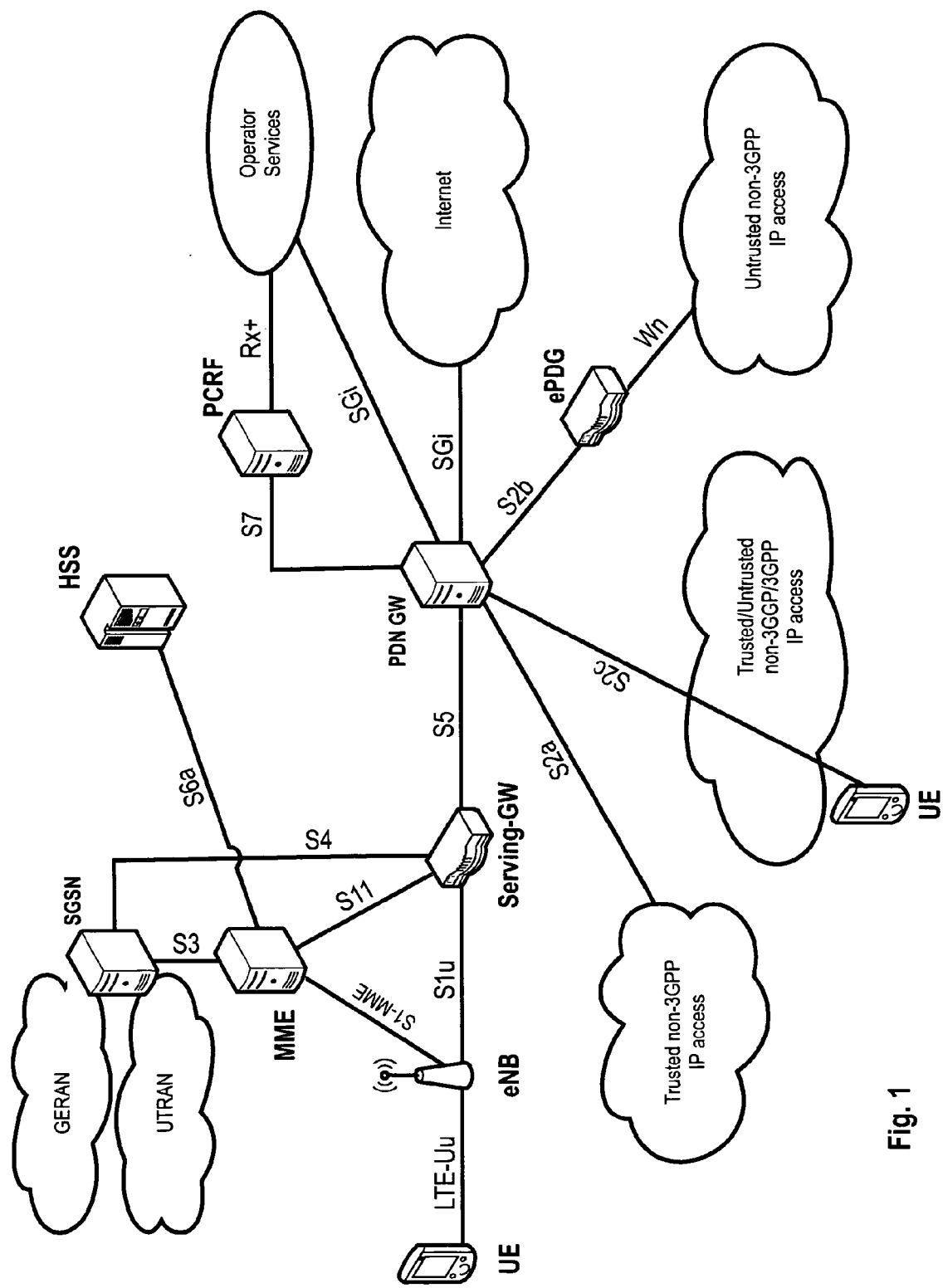
FIG. 1 shows an exemplary architecture of a 3GPP LTE system.
Figure 2:
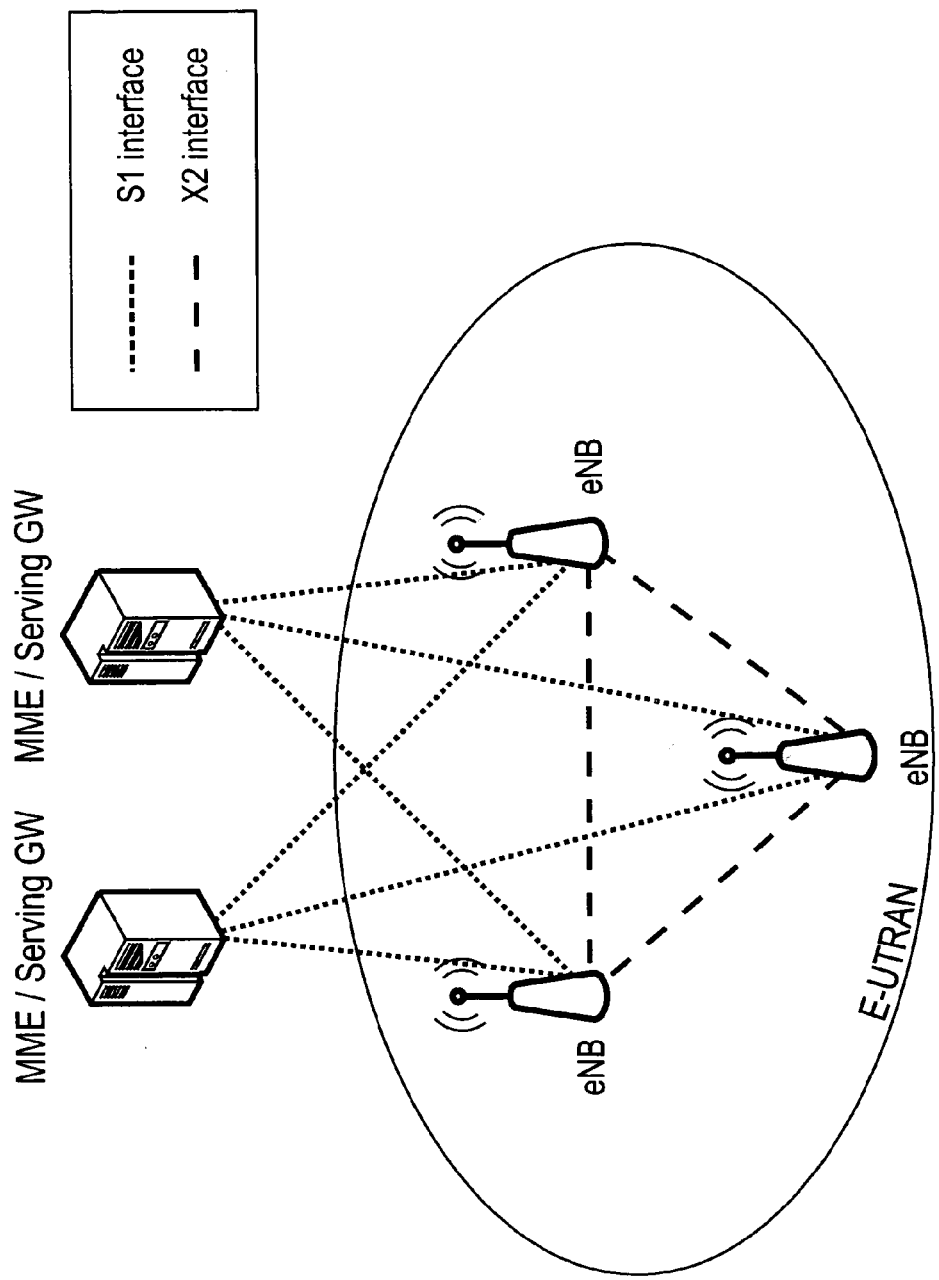
FIG. 2 shows an exemplary overview of the overall E-UTRAN architecture of 3GPP LTE.
Figure 3:
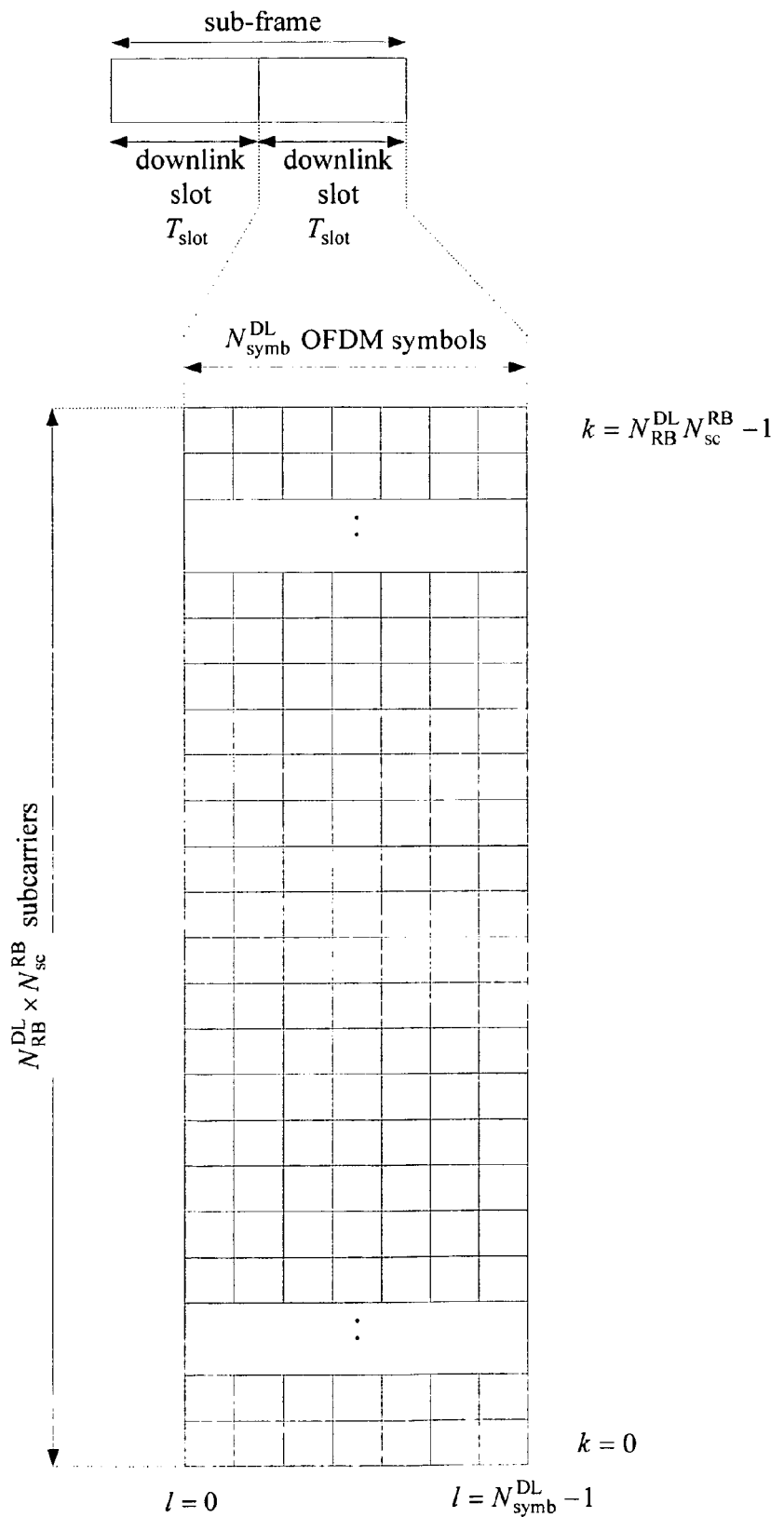
FIG. 3 shows an exemplary sub-frame structure on a downlink component carrier as defined for 3GPP LTE (Release 8/9)
Figure 4:
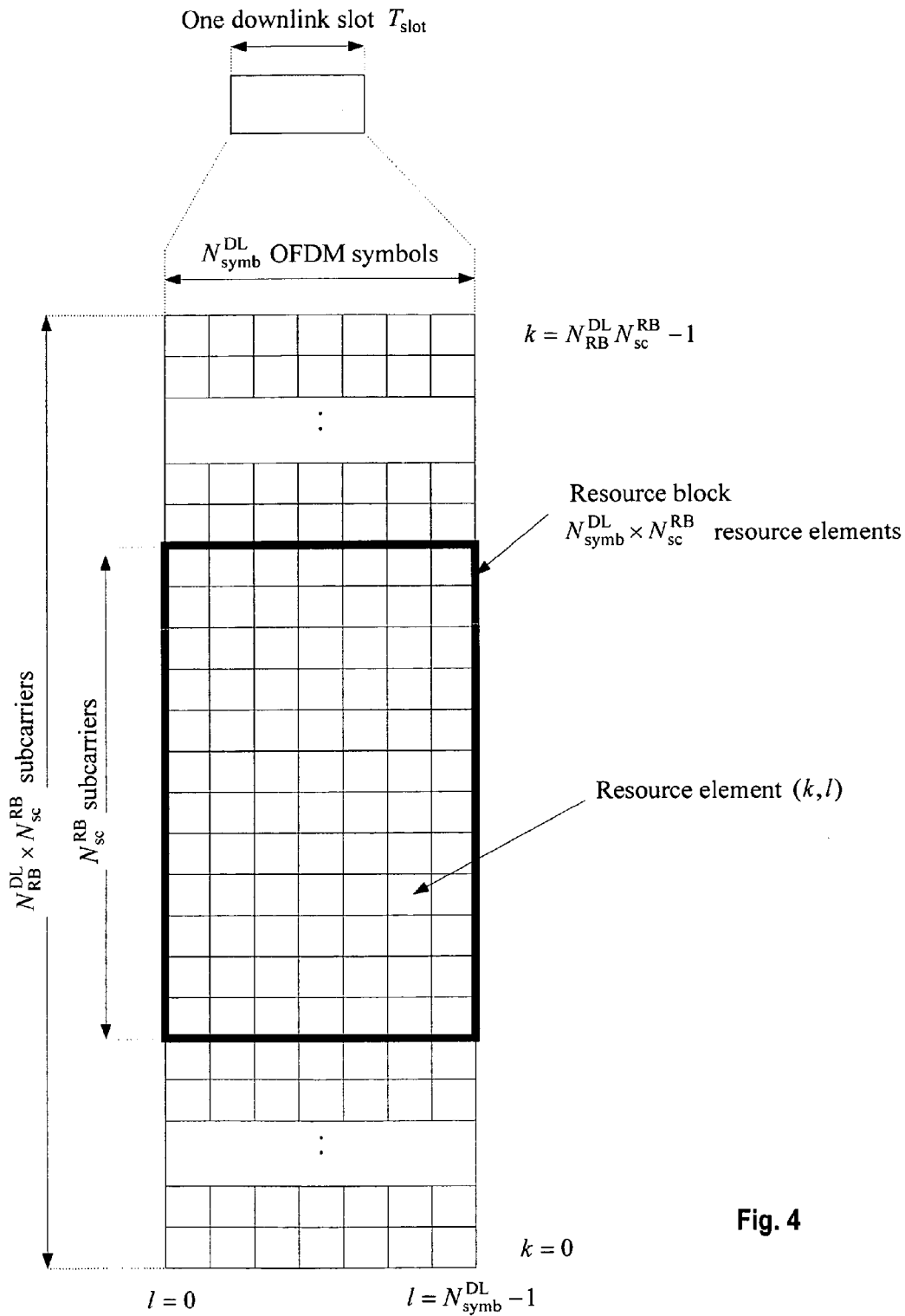
FIG. 4 shows an exemplary downlink resource grid of a downlink slot as defined for 3GPP LTE (Release 8/9)
Figure 5:
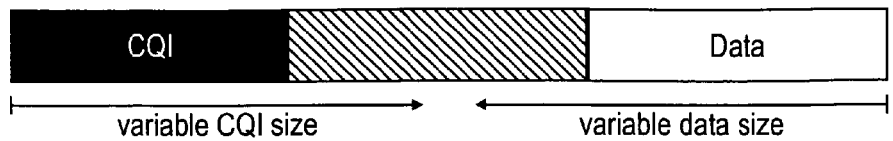
FIG. 5 shows the variable border between CQI part and data part of an uplink transmission.
Figure 6:
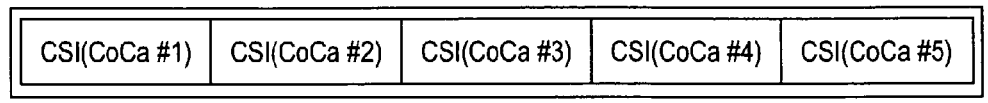
FIG. 6 illustrates the channel state information feedback for five component carriers, which is composed of the CSI reports for the five component carriers.
Figure 7:
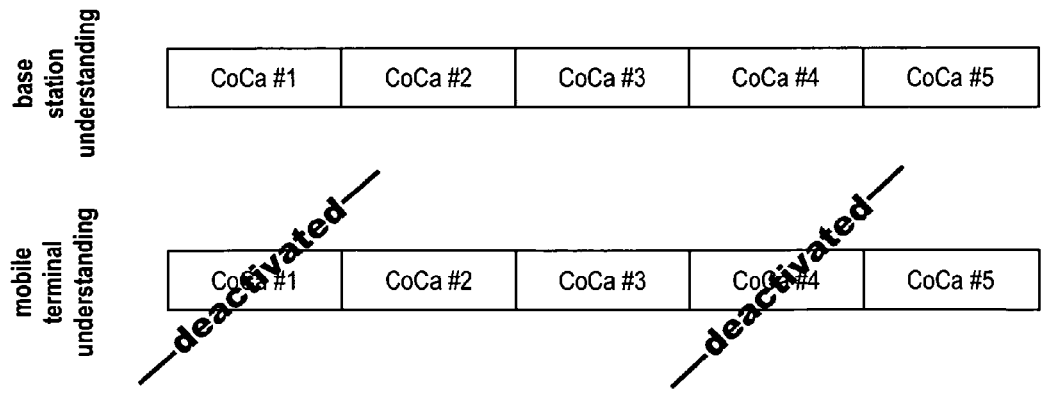
FIG. 7 illustrates the misunderstanding about the activation status of particular component carriers between the eNodeB and the UE.
Figure 8:
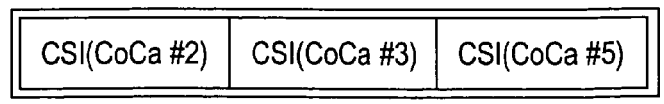
FIG. 8 illustrates the channel state information feedback composed of CSI reports for only three component carriers, after two of the available component carriers are deactivated.

The following paragraphs will describe various embodiments of the invention. For exemplary purposes only, most of the embodiments are outlined in relation to an (evolved) communication system according to LTE and its currently developed enhancements discussed in the Technical Background section above.

As indicated above, the present invention relates in general to the reporting of channel state information from a user equipment (UE) to a base station (eNodeB) in a communication system where a plurality of component carriers are used to allow communication between the UE and the eNodeB.

For ease of the following explanation, it is assumed that one specific component carrier, out of the plurality of component carriers the user equipment has configured, is in such a state that no channel state information calculation is performed, e.g. because it is not possible or reasonable due to e.g. measurement uncertainties due to noise or interference. There may be various reasons why a channel state information calculation is not possible or reasonable for this specific component carrier. It should be noted that only the most relevant are mentioned in the following paragraph, and there may be further reasons not mentioned.

In particular, for component carriers that are configured but deactivated, the user equipment usually does not determine channel quality information since the UE is not required to operate its receiving and measurement circuitry for such a component carrier. In order to reduce the power consumption, some or all corresponding hardware and/or software components can be shut down. Or, despite the component carrier being already activated, the user equipment does not have sufficient time to perform the measurements before the channel state information is to be transmitted to the base station. Or, despite the component carrier being already activated, the component carrier is only activated for such a short time, that no channel quality measurement is possible or no reliable results can be achieved. Another example would be that the downlink subframe on which the channel quality measurement is to be performed by the user equipment is not valid for at least one activated component carrier, e.g. as defined by 3GPP TS 36.213 7.2.3, if the downlink subframe is not a downlink subframe for that particular user equipment, or if the downlink subframe is not an MBSFN subframe, or if the downlink subframe does not contain a DwPTS field in case the length of DwPTS is $7680 \times T_s$ and less, or if the downlink subframe does not fall within a configured measurement gap for that user equipment (all of which may be component-carrier-specific).

Bearing the above assumption in mind, the channel state information report of the prior art would only include the channel state information for component carriers for which channel state information was actually calculated; correspondingly, the channel state information report would not include data field(s) with channel state information for component carriers for which no channel state information was calculated. While this procedure seems logical at first glance, there are several disadvantages as explained before.

One aspect of the invention ensures that the channel state information report comprises a field for each component carrier, independent whether the calculation of channel quality information is executed or not. Thus, the channel state information report for example includes a data field also for each deactivated component carrier, in addition to the ones for each of the activated component carriers, preferably preserving the same field order as if all the configured component carriers were activated.

Consequently, the channel state information report is of a particular size that is not affected by the activated/deactivated status of the specific component carrier. In other words, the payload of the channel state information report is independent from the activation status of the component carriers. This has the benefit that the association between channel state information values and the corresponding component carrier is unambiguous for the base station, despite possible status misunderstandings between the base station and user equipment. Since the size of the channel state information report is not affected by the component carrier status, the channel state information data and the user data is correctly decoded by the base station; no data corruption should take place, assuming a noise-/lossless transmission.

A further aspect of the invention in connection with the first aspect is that the data fields in the channel state information report for said specific component carrier for which the user equipment did not perform a channel quality information calculation, includes feedback element values that allow the base station to learn the status in which the component carriers are maintained by the user equipment. In particular, the data field for the specific component carrier (the one for which the calculation of the channel status information was not performed) includes the same feedback elements as the remaining data fields for the activated component carriers; however, the values of these feedback elements of the data field for said specific component carrier are defined such that the base station is able to deduce that the data field does not comprise valid channel state information but that no calculation of channel state information was performed by the user equipment for said specific component carrier and deduce for what reason.

Put differently, the channel state information in the data field for the component carrier for which no channel state information calculation could be performed is not intended to reflect a real channel quality but is only used to provide the base station with (additional) information on the status of said component carrier and in consequence with the reason as to why no calculation of the channel quality information was performed. The status may be e.g. "configured but deactivated" or "configured and activated but not yet ready to be the target of channel quality information calculation" (also cf above).

The data fields for each of the remaining component carriers provide actual, i.e. valid, information on the previously calculated channel quality for said (activated) component carriers.

Therefore, the base station can easily determine whether there is a mismatch as to the activated/deactivated status of each component carrier, and if there is a mismatch, may consider issuing appropriate commands to the UE. For example, if the base station assumes that a component carrier is activated, and then learns that the UE has deactivated considers the component carrier, the base station can issue a new MAC CE to the UE such that said component carrier is activated forthwith. If the base station on the other hand assumes that a component carrier is deactivated, and then learns that the UE considers the component carrier as activated, the base station can issue a new MAC CE to the UE such that said component carrier is deactivated forthwith.

When assuming the actual feedback elements and their value ranges are preferably not to be changed for the channel state information for the specific component carrier, the values of channel state information elements should be selected such that they usually are not used for reporting on an actual channel quality so as to avoid misunderstandings as to the meaning of the channel state information. Put differently, the values of the feedback elements of the channel state information for the specific component carrier shall not indicate a reasonable channel quality but instead indicate non-sense, as it were.

The content of the channel state information fields comprise different feedback elements to indicate the channel quality for a particular component carrier. According to current standardization, it may comprise one or more of the following: a modulation and coding scheme index (MCSI) value for the complete component carrier (i.e. all subbands, set S), an MCSI offset value for each subband of the component carrier (the MCSI offset value is encoded as a differential to the MCSI value of the set S of subbands), an MCSI offset value for a set M of subbands of the component carrier (set M encompasses less subbands than set S; the MCSI offset value may again be encoded as a differential to the MCSI value of the complete component carrier) and a precoding matrix indicator. A rank indicator (RI) is also transmitted for the channel state information reporting, however not within the channel state information message as such but separately, because the size of the channel status information report (MCSI & PMI) depends on the reported RI.

Which of these feedback elements is actually included into the channel state report depends amongst other things on the transmission and reporting modes configured by the base station. In each case and independent from the feedback elements included, the values of the elements in the channel state information field for the specific component carrier should be defined in a way that allows the base station to determine whether the content of said field is a genuine channel quality indication or whether it is an indication as to the status of the associated component carrier for which no channel state information was calculated.

The channel state information reporting according to this aspect is more reliant and secure than the one employed in prior art systems so far. For instance, the base station can immediately deduce which component carriers used by the user equipment are activated/deactivated, based on the content of the channel state report, i.e. on the values of the feedback elements reported as channel state information. Therefore, even if there is a momentary misunderstanding between the base station and the user equipment, the base station can correct its own misunderstanding.

Further aspects of the invention relate to details how the feedback elements of the predetermined channel state information for the specific component carrier can be defined most advantageously. For instance, the payload for the channel state information data fields of the specific component carrier may contain as few bits as possible to not create too much "overhead". To achieve this, a rank indicator value=1 may be chosen, since for values of rank indicator>1 the channel state information is expanded to report channel quality for two codewords instead of one.

In order to allow the base station to distinguish between different reasons why the calculation of the channel state information was not performed by the user equipment for the specific component carrier, it is necessary to predefine respectively different channel state information values in said respect that are then encoded into the channel state information of the data field for the specific component carrier. For instance, when the channel state information comprises an MCSI value for the complete component carrier and an MCSI offset value for a set M of subbands of the component carrier, both said MCSI values can be defined to result in more than one effective MCSI value for the set M of subbands that is not a valid value. In particular, assuming a valid range of 0 to 15 for any of the MCSIs, an effective MCSI value of 17, 18 and ≥19 could then encode three different component carrier status, i.e. reasons as to why no channel state information was calculated by the user equipment. This will be explained in more detail further below. Accordingly, the base station may distinguish the three invalid values and learn of the corresponding status of the specific component carrier.

A further aspect of the invention is to suggest a structure for transmission (referred to as a message, or channel state information message, in the following) that allows conveying the channel state information as explained above. In particular, the channel state information message includes a data field for each component carrier which the user equipment has configured, independent from whether channel state information has been indeed calculated for a specific component carrier or not. The content of each data field has been explained above.

Content of the Channel State Information Report

The CSI report contains feedback information with regard to the quality perceived by the user equipment so as to allow the base station to match the information data rate to the measured channel quality. The content of the CSI report also depends on the reporting and transmission modes configured by the eNodeB. An overview of the reporting modes and transmission modes is given in the background section, together with information on the specific content of the CSI report for each case. There are mainly three feedback elements—MCSI, PMI and RI—which are important components for link adaptation. In the following, these parameters will be explained in more detail.

Modulation and Coding Scheme Index (MCSI)

As already explained before, adaptive modulation and coding (AMC) can be used to match the information data rate for each user to the variations in the received signal quality. The degrees of freedom for the AMC consists of the modulation and coding schemes, and the particular combination of a modulation scheme and a coding rate is indicated using the Modulation and Coding Scheme Index (MCSI). A list of modulation schemes and code rates that can be signaled by means of an MSCI is shown in Table 2 below.

TABLE 2

| MCSI index | Modulation Scheme | Code Rate * 1024 | Spectral Efficiency |
|---|---|---|---|
| 0 | Out of Range (OoR) | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

As introduced in the Background section, there are several Reporting Modes and Transmission Modes that have an impact on the content of the Channel State Information reporting, and in particular on the parameters that are included to report on the channel quality of a component carrier.

In the Reporting Modes 3-0 and 3-1, one MCSI value is encoded for each subband per codeword. The MCSI value for each subbands for each codeword is encoded differentially using 2-bits relative to its respective wideband MCSI, according to the following:

Subband differential MCSI offset level=subband MCSI index−wideband MCSI index

Therefore, the MCSI index for each subband can be calculated by adding the wideband MCSI index and the offset level, coded by the Differential MCSI value.

The mapping of the differential MCSI value and the actual offset level that is to be applied to the wideband MCSI index is determined by the following Table 3 for reporting modes 3-0 and 3-1.

TABLE 3

| Subband differential MCSI value ($MCSI_{offset\_subband}$) | Offset level |
|---|---|
| 0 | 0 |
| 1 | 1 |
| 2 | ≥2 |
| 3 | ≤−1 |

For instance, if the wideband MCSI encodes MCSI index 8 (16QAM and 490/1024 code rate) and the 2-bit differential MCSI value for subband #1 is 1, then the effective MCSI index for said subband #1 is 9 (64QAM, 466/1024 code rate). When the differential MCSI value for subband #1 is 2, the resulting MCSI index for said subband #1 is at least 2 indexes higher than the wideband MCSI, i.e. ≥10.

In the reporting modes 2-0 and 2-2 one MCSI value for the M selected subbands is reported per codeword by the user equipment. The MCSI value for the M selected subbands for each codeword is encoded differentially using 2-bits relative to its respective wideband MCSI value according to the following:

Differential MCSI offset level=MSCI index for M selected subband−wideband MCSI index Therefore, the base station can calculate the MSCI index for the selected M subbands by adding the wideband MCSI index and the differential MSCI offset level, as encoded by the subband differential MCSI value according to the following Table 4 for reporting modes 2-0 and 2-2.

TABLE 4

| Differential MCSI value ($MCSI_{offset\_setM}$) | Offset level |
|---|---|
| 0 | ≤1 |
| 1 | 2 |
| 2 | 3 |
| 3 | ≥4 |

Precoding Matrix Indicator (PMI)

For some transmission modes, precoding feedback is used for channel dependent codebook based precoding and relies on the UEs reporting the precoding matrix indicator. Each PMI value corresponds to a codebook index according to the corresponding Tables in Chapter 6.3.4.2.3 "Codebook for precoding" of 3GPP document TS 36.211 v10.0.0. The precoder, whose index constitutes the PMI, is the precoder that maximizes the aggregate number of data bits which could be received across all layers.

As apparent from the above-mentioned tables, the PMI may be 2 or 3 bits long depending on the antenna ports used for transmission and the associated rank indicator.

Rank Indicator (RI)

The UE can also be configured to report the channel rank via a rank indicator, which is calculated to maximize the capacity over the entire bandwidth.

In particular, for spatial multiplexing, the UE shall determine a RI corresponding to the number of useful transmission layers. For transmit diversity, RI is equal to one.

In practice, the rank indicator has influence on whether the channel state information is reported for one or two codewords. For instance, the channel state information of only one codeword is reported when RI is 1, and the channel state information of two codewords is reported when RI is >1.

Simple Embodiment of the Invention

As shown in Table 2, an MCSI index 0 is associated to an "out of range" interpretation, meaning that the channel is in such a bad condition that even a transmission using an extremely inefficient modulation and coding scheme, such as indicated by MCSI level 1, cannot be reliably conveyed across the channel. Therefore, if the UE does not perform CSI calculation for a component carrier, it could report MCSI index 0 as feedback element where applicable in the CSI report.

The simple embodiment does not enable the base station to clearly distinguish between the case that the UE did not perform a CSI calculation and the case that the UE did perform such a CSI calculation however arriving at an MCSI that is most accurately reflected by reporting MCSI index 0.

Preferred Embodiments of the Invention

In the following, embodiments of the invention will be presented for an improved channel state reporting that enables such a distinction, and which may furthermore even allow a distinction between various reasons if and why the UE did not perform a CSI calculation.

It is assumed that a UE is configured to provide aperiodic CSI reports to the eNodeB, in a system where each of five component carriers #1-5 has a 20 MHz bandwidth, therefore each being composed of 13 subbands. It is further assumed for the moment that one specific component carrier of the five component carriers, e.g. component carrier #2, has been deactivated by the UE without the base station knowing this.

The above assumptions are made only for illustration purposes and should not be understood as limiting the scope of the invention. For example, more than one component carrier can be deactivated, or for any other reason than the deactivation, the channel state information calculation may not be performed for this one or more component carriers.

The corresponding reporting and transmission mode is configured by the eNodeB via RRC. The UE performs channel quality measurements on component carriers #1, 3-5 that are activated. No channel quality measurements are performed for deactivated component carrier #2.

When generating the CSI report, the channel state information for component carrier #2 is set according to the following. As explained before, the channel state information for component carrier #2 shall be not valid, but shall be predetermined between eNodeB and UE. The actual parameters and corresponding values to achieve this, differ between the reporting modes and transmission modes. In the following, different cases will be presented, which are grouped based on which parameters are at least included in the CSI report. For simplicity, the following assumes that a component carrier consists of a certain number of subbands (as outlined before), a set S is the set or a subset of subbands of such a component carrier, and a set M of subbands contains fewer subbands than the set S.

MCSI for Set S of Subbands, MCSI for Set M of Subbands

In reporting modes 2-0 and 2-2 and for all transmission modes, the CSI report at least comprises an MCSI for the set S of subbands ($MCSI_{setS}$) and an MCSI offset value for set M of the subbands of said component carrier ($MCSI_{offset\_setM}$). $MCSI_{setS}$ can have integer values from 0 to 15, and $MCSI_{offset\_setM}$, which is encoded as a 2-bit differential with regard to $MCSI_{setS}$, may have integer values from 0 to 3, which represent the offset according to Table 4.

In order to encode the deactivated status of component carrier #2, the effective $MCSI_{setM}$, i.e. the MCSI for subset M, shall have an invalid value, i.e. outside the range of valid values of an MCSI. This means that the $MCSI_{setM}$ shall be <0 or >15. This can be achieved by the following settings of the feedback elements:

$MCSI_{setS}$=15 and $MCSI_{offset\_setM}$=1, 2 or 3. By using Table 4 to translate between the $MCSI_{offset\_setM}$ and the actual offset level, this results in that the effective $MCSI_{setM}$ is 17, 18 or ≥19. It should be noted that setting $MCSI_{offset\_setM}$=0 is not possible since the effective $MCSI_{setM}$ could be a reasonable value to report an MCSI of 15 for set M. Furthermore, as no unambiguous negative offset level can be represented, it is not unambiguously possible to obtain an effective $MCSI_{setM}$ smaller than 0; even if $MCSI_{setS}$=0 and $MCSI_{offset\_setM}$=0, the effective $MCSI_{setM}$ is ≤1 i.e. could be 0 or 1, which are reasonable values to report.

Since an MCSI has a valid range of 0 to 15, a MCSI of >15 is not a genuine channel state information and the base station may easily infer that the channel state information for component carrier #2 has a different meaning.

Since three different effective $MCSI_{setM}$ values outside the valid range can be reported, namely values 17, 18 and ≥19, the reporting may differentiate between three different status. In this case e.g. a value of 17 is reported, which was pre-determined to encode a deactivated status of a component carrier.

Alternatively, $MCSI_{setS}$=14 and $MCSI_{offset\_setM}$=2 or 3, in which case the effective $MCSI_{setM}$ is 17 or ≥18.

Alternatively, $MCSI_{setS}$=13 and $MCSI_{offset\_setM}$=3, in which case the effective $MCSI_{setM}$ is ≥17.

For reporting mode 2-0 in combination with transmission mode 3, and for reporting mode 2-2 in combination with transmission modes 4 or 8, a rank indicator is transmitted for the CSI report. In those cases, it is preferable to use RI=1 so as to minimize the payload size of the CSI report.

Furthermore, for reporting mode 2-2 two or four precoding matrix indicators are transmitted as well in the CSI report. In said case, instead of or in addition to using the effective $MCSI_{setM}$ for differentiating between different status, the precoding matrix indicators could be also or in addition used to differentiate between different status. For instance, while the $MCSI_{offset\_setM}$ and $MCSI_{setS}$ result in an effective $MCSI_{setM}$>15 thus encoding the fact that the CSI is not genuine for component carrier #2, the precoding matrix having 2 or 3 bits can further encode 4 or 8 different status, e.g. a deactivated component carrier, an activated component with no sufficient measurements time for the UE, that the reference resource for the downlink subframe is not valid etc.

MCSI for Set of Subbands S, MCSI for Each of the Subbands

In reporting modes 3-0 and 3-1 and for all transmission modes, the CSI report comprises the MCSI for the set S of subbands ($MCSI_{setS}$) and for each subband in the component carrier an MCSI offset value ($MCSI_{offset\_subband}$). Again, $MCSI_{setS}$ can have integer values from 0 to 15, and $MCSI_{offset\_subband}$, which is encoded as a 2-bit differential with regard to $MCSI_{setS}$, may have integer values from 0 to 3, which represent the offset according to Table 3.

In order to encode the deactivation status of the component carrier #2, the effective $MCSI_{subband}$ shall be outside the valid range of 0 to 15, which can be achieved by the following settings:

$MCSI_{setS}=15$ and $MCSI_{offset\_subband}=1$ or 2, which would result in an effective $MCSI_{subband}$ of 16 or ≥17, according to Table 3 for mapping the subband differential MCSI value into the offset level. For this combination, two different component carrier status could be distinguished.

Alternatively, $MCSI_{setS}=14$ and $MCSI_{offset\_subband}=2$ is also possible, which would then result in an effective $MCSI_{subband}$ of ≥16.

Alternatively, $MCSI_{setS}=0$ and $MCSI_{offset\_subband}=3$, which would result in an effective $MCSI_{subband}$ of ≤−1.

For reporting mode 3-0 in combination with transmission mode 3, and for reporting mode 3-1 in combination with transmission modes 4, 8 and 9, a rank indicator value is transmitter for the CSI report. Advantageously, the RI may be set to 1, so as to reduce the feedback payload.

Furthermore, the CSI report for reporting mode 3-1, independently from the transmission mode, comprises at least one precoding matrix indicator, i.e. for transmission modes 1-8, one PMI, and for transmission mode 9, two PMIs. The PMI(s) can be used in addition or as an alternative to the $MCSI_{setS}$ and $MCSI_{offset\_subband}$ combination (explained above) so as to encode the component carrier status, i.e. the reason why the calculation of the channel state information was not performed.

Moreover, there arises the problem that due to a transmission error the effective $MCSI_{subband}$ is not outside the range. This problem may be mitigated by another embodiment of the invention in which the values for $MCSI_{setS}$ and the $MCSI_{offset\_subband}$ for each subband are set so that each effective $MCSI_{subband}$ is outside the range of valid MCSIs. Thus, even if a transmission error results in that a particular effective $MCSI_{subband}$ is inside the valid range of MCSI values, the eNodeB may still learn from the remaining $MCSI_{subband}$ that the component carrier is e.g. deactivated (or any other status e.g. activated but not yet ready to be the target for channel quality measurements). Alternatively, the eNodeB may discard the whole CSI message as erroneous, since it knows that a transmission error must have occurred somewhere in the channel.

MCSI for Set S of Subbands, Rank Indicator

In reporting mode 1-2 in combination with transmission modes 4, 8 and 9, the CSI report comprises at least the MCSI for the set S of subbands of the component carrier ($MCSI_{setS}$), and one rank indicator is transmitted separately for the CSI.

So as to encode the component carrier status, RI is set to >1, e.g. 2, 4 or 8 depending on the number of available TX antenna ports at the eNodeB. If the UE decides for a RI>1, the $MCSI_{setS}$ is transmitted per codeword, and both $MCSI_{setS}$ are set to 0. Therefore, a combination of RI>1 and the $MCSI_{setS}=0$ for both codewords encodes one component carrier status, e.g. being deactivated. Most likely, this will not generate a conflict with the normal CSI reporting, since it doesn't make sense for a UE to report for two codewords for a component carrier which MCSI is calculated to be 0. In said case, the usual behavior would lead the UE to set RI=1 and only report one MCSI=0 so as to reduce the overhead for such a situation.

The above CSI parameter encoding can be applied to every reporting mode and transmission mode combination that includes a RI and the $MCSI_{setS}$ such as reporting modes 2-2 and 3-1 for transmission modes 4, 8 and 9, or reporting modes 2-0 and 3-0 for transmission mode 3.

Additionally, if the UE wants to differentiate between more than one component carrier status, then the precoding matrix indicator may be used in said respect. As explained previously, the PMI may be 2 or 3 bits and thus may encode up to 8 different reasons why the UE did not perform the calculation of the channel quality information.

Rank Indicator

In reporting modes where RI is transmitted, the following embodiment is also a possible solution to encode the component carrier status into the CSI report for said component carrier.

The RI is usually transmitted by putting encoded RI bits on certain resource elements (cf 3GPP TS 36.212, section 5.2.2.6). As the modulation for those resource elements is generally one of QPSK, 16-QAM, 64-QAM, this implies that for any regular RI value 1-8 a non-zero power modulation symbol is transmitted on the respective resource elements. In order to encode a component carrier status (e.g. deactivated or any other reason why no CSI was calculated), the UE determines the resource element locations for a normal RI transmission, however then does not transmit any signal on those resource elements. In addition, no further CSI feedback elements (MCSI, PMI) need to be transmitted in such a case, reducing the required overhead substantially. The eNodeB can then employ a power detection mechanism to detect that on said RI resource elements for a specific component carrier, no transmit signal is present (i.e. only noise and/or interference is present), and thereby deduce that the UE did not perform a CSI calculation for that component carrier and also that it should not expect any further feedback elements such as MCSI and/or PMI value(s) for such a component carrier. It is therefore preferable that according to this embodiment, an RI is transmitted for each configured component carrier.

MCSI for Set S of Subbands, Precoding Matrix Indicator

In reporting modes 1-2, 2-2 and 3-1 and for all transmission modes, the CSI report comprises at least an MCSI for set S of subbands of the component carrier ($MCSI_{setS}$), and one precoding matrix indicator. For reporting mode 1-2 with transmission modes other than 4, 8 or 9, in which the CSI report does not comprise other MCSI values (such as $MCSI_{offset\_subband}$ or $MCSI_{offset\_setM}$) or for which no RI is transmitted, the following embodiment is the preferable solution to encode the component carrier status into the CSI report for said component carrier.

The $MCSI_{setS}$ is set to be 0, and each available PMI value is set to a predetermined value, e.g. all PMI bits 0 or 1.

This combination of the feedback elements will most likely not be encountered during "normal" CSI reporting. When the MCSI=0, the information usually encoded into the PMI is not really relevant, since the channel quality is worse than the smallest reportable MCSI index (i.e. index 1 in Table 2) can represent. A PMI value can be predetermined arbitrarily and associated with a component carrier status. Preferable values may be simple bit sequences such as all PMI bits to 0 or 1; or setting the PMI value such that no unequal transmit power distribution or phase shift across the antenna ports is encoded (according to the usual PMI understanding, cf 3GPP TS 36.213 section 7.2.4 and 3GPP TS 36.211 section 6.3.4.2.3).

Depending on the further content of the CSI report for component carrier #2, different status can be encoded, e.g.

using the other PMI values, the RI value, additional MCSI values for subbands or set M of subbands.

The above-listed feedback element settings are not meant to be complete. Rather, a skilled person should learn thereby how to set the feedback elements to encode the component carrier status. Other possibilities on how to set the values of said feedback elements are possible and should be readily apparent to a person skilled in the art, upon studying the above explanation of the principles of the invention.

In summary, for each reporting mode and transmission mode combination it is possible to encode at least one status information for a component carrier for which the UE did not perform the channel state information calculation. In addition, the UE should also be able to differentiate, i.e. encode, different status by using additional parameters in the CSI report for said particular component carrier.

Therefore, the eNodeB receiving the CSI report will extract all information for each component carrier. For component carriers #1, 3-5, the eNodeB will process the channel quality information provided therein and proceed as usual, i.e. configure the adaptive modulation and coding appropriately.

For component carrier #2 (which is assumed to be deactivated), the CSI report contains one of the above-listed parameter combinations to indicate the fact that the associated component carrier is deactivated. This information may e.g. be seen as feedback from the UE as to whether a component carrier is still activated or was deactivated by the UE.

It is exemplary assumed that the eNodeB expected the component carrier #2 to be still activated. With the feedback information from the UE via the CSI report, the eNodeB, could now transmit a MAC control element instructing the UE to activate component carrier #2 again.

According to a different scenario, the eNodeB previously instructed the UE to activate component carrier #2. Since the instruction did not reach the UE, component carrier #2 was maintained deactivated, and the eNodeB notices this by receiving the "irregular" CSI according to one of the embodiments of the invention for component carrier #2 within the next CSI report. Accordingly, the eNodeB knows that the MAC CE did not reach the UE, and will thus send another MAC CE.

Conversely, assuming the eNodeB instructed the UE to deactivate component carrier #1, the eNodeB learns from the "regular" CSI for component carrier #1, that same is still activated. Therefore, the eNodeB will send another MAC CE to again instruct the UE to deactivate component carrier #1.

Even more advantageously, the CSI may encode that component carrier #2 is activated but that a channel state information calculation could not be performed for the reason that e.g. that the UE is not yet ready to report a measured/calculated CSI reflecting the conditions on component carrier #2. The eNodeB decodes this status information, and thus may learn that the instruction for activating component carrier #2 was received and properly executed by the UE. No further MAC CE is necessary, since a CSI report with valid channel state information can be soon expected.

Overall, the eNodeB can distinguish between different states and execute the appropriate action. For instance, if the reported CSI is e.g. a MCSI between 1 and 15, the eNodeB may assume that the component carrier is properly configured and used by the UE.

If the MCSI is 0, the eNodeB learns that the component carrier is configured and activated but with extremely bad SINR, in which case the eNodeB might decide to deactivate or deconfigure the component carrier, particularly if the MCSI 0 is reported during several successive CSI reports.

When the MCSI is outside the range of 0 to 15 (or any of the other feedback element combinations indicates a non-valid MCSI feedback, cf above), the eNodeB learns that the UE did not perform the channel quality calculation and preferably for what reason. Based on this information, the eNodeB might decide to activate/deactivate the component carrier or simply wait for the UE to perform the measurements and calculations for channel quality of the component carrier.

Figure 9:
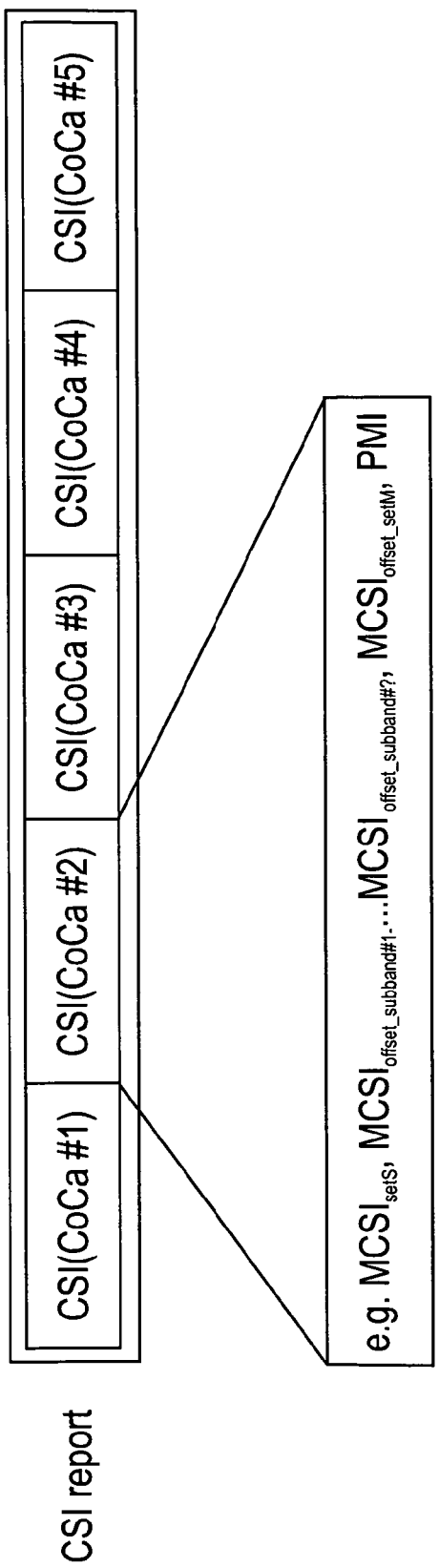
FIG. 9 shows an exemplary CSI report including data fields for each configured component carrier, and further the content of every data field, wherein the all possible feedback elements are listed, according to an embodiment of the invention.

FIG. 9 shows a CSI message in which data fields are provided for each and every component carrier, in this exemplary scenario for component carriers #1-#5. For the specific component carrier #2 for which no CSI was calculated by the UE, the content of the data field, i.e. the feedback elements, is depicted as well. As apparent therefrom, the data fields may contain e.g. a $MCSI_{setS}$, $MCSI_{offset\_subband\#1}$ · · · $MCSI_{offset\_subband\#?}$, $MCSI_{offset\_setM}$, PMI, or any combination therefrom, depending on the reporting mode and transmission mode combinations explained above. Put differently, all the depicted feedback elements need not be reported at the same time. For instance, the various $MCSI_{offset\_subband\#1}$ and the $MCSI_{offset\_setM}$ are usually not reported together.

The above scenarios have been described for the aperiodic CSI reporting only. However, the above-described basic principle of the invention is also applicable to periodic CSI reporting. In the periodic reporting the parameters of the CSI report may not be transmitted in the same subframe, and further other different reporting modes are defined for periodic CSI reporting. But nonetheless, basically the same feedback elements are transmitted as channel quality feedback from the UE to the eNodeB. Therefore, the periodic CSI report for component carrier #2 may also encode the component carrier status.

Another embodiment of the invention relates to the implementation of the above described various embodiments using hardware and software. It is recognized that the various embodiments of the invention may be implemented or performed using computing devices (processors) that are suitably controlled by executable instructions that cause the computing device to perform the functions according to the different embodiments of the invention described herein. A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer-readable storage media, for example RAM, EPROM, EEPROM, flash memory, registers, hard disks, CD-ROM, DVD, etc.

Most of the embodiments have been outlined in relation to a 3GPP-based architecture of a communication system and the terminology used in the previous sections mainly relates to the 3GPP terminology. However, the terminology and the description of the various embodiments with respect to 3GPP-based architectures are not intended to limit the principles and ideas of the inventions to such systems only. Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently and its enhancements (LTE-A) discussed by the 3GPP.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

The invention claimed is:

1. A method for reporting channel state information from a user equipment to a base station in a communication system in which a plurality of component carriers are configured for communication between the base station and the user equipment, the method comprising the following steps performed by the user equipment:
    calculating channel state information values for each component carrier that is activated, except for at least one activated or deactivated component carrier for which the calculation of channel state information values is not performed,
    preparing a channel state information message, comprising one data field for each of the plurality of configured component carriers that is deactivated and for each of the plurality of configured component carriers that is activated, wherein the data field for said at least one activated or deactivated configured component carrier comprises predetermined channel state information values encoding the reason why the calculation of the channel state information values was not performed for said at least one activated or deactivated configured component carrier, and wherein the remaining data fields each comprise the calculated channel state information values for the associated component carriers, and transmitting the channel state information message to the base station,
    wherein the component carriers are respectively composed of a plurality of subbands, and
    wherein the channel state information values comprise a Modulation and Coding Scheme Index (MCSI) value for all subbands and one offset value for each of the subbands,
    wherein the MCSI value and each offset value are combined to indicate the effective MCSI value for each subband, and wherein the predetermined channel state information values for the at least one component carrier comprise an MCSI value and offset values for the subbands defined such that the effective MCSI value for at least one subband is outside the range of valid MCSI values.

2. The method according to claim 1, wherein the reason why the calculation of the channel state information values was not performed is one of the following: the component carrier is configured but deactivated, the component carrier is configured and activated but not yet ready to perform the calculation of the channel state information values, or the calculation of the channel state information values calculation was performed but failed.

3. The method according to claim 1, wherein the component carriers are respectively composed of a plurality of subbands, and wherein the channel state information values comprise the Modulation and Coding Scheme Index (MCSI) value for all subbands and one offset value for a subset M of the plurality of subbands, wherein the MCSI value and the offset value are combined to indicate the effective MCSI value for the subset M of subbands, and wherein the predetermined channel state information values comprise an MCSI value and an offset value for the subset M of subbands defined such that the effective MCSI value for the subset M of subbands is outside the range of valid MCSI values.

4. The method according to claim 1, wherein each different effective MCSI value outside the range of valid MCSI values indicates a different reason why the calculation of the channel state information values was not performed.

5. The method according to claim 1, wherein the MCSI value and the offset values for the subbands are defined such that more than one of the effective MCSI values of subbands is outside the range of valid MCSI values, for encoding more than one reason, why the calculation of the channel state information values calculation was not performed.

6. The method according to claim 1, wherein if a rank indicator is also reported for the channel state information values, the rank indicator for the predetermined channel state information values is set to 1.

7. The method according to claim 6, wherein the rank indicator is transmitted to the base station separately from the channel state information message.

8. The method according to claim 1, wherein the component carriers are respectively composed of a plurality of subbands, and wherein the channel state information values comprise the Modulation and Coding Scheme Index (MCSI) value for all subbands and at least one precoding matrix indicator, wherein the at least one precoding matrix indicator of the predetermined channel state information values for the at least one component carrier is set to a predetermined value, and the MCSI value of the predetermined channel state information values is set to 0.

9. The method according to claim 1, wherein the component carriers are respectively composed of a plurality of subbands, wherein a rank indicator is reported to the base station for the channel state information values, and the rank indicator for the predetermined channel state information values for the at least one component carrier is set to >1 such that the predetermined channel state information refers to two codewords, and the predetermined channel state information values comprises one Modulation and Coding Scheme Index (MCSI) value for all subbands for each of the two codewords, and both MCSI values are set to the value indicating the worst channel quality.

10. The method according to claim 1, wherein the reporting of the channel state information is aperiodic.

11. The method according to claim 1, wherein the base station has information which component carrier should be activated and deactivated, and the base station receives the channel state information message, including the channel state information values for the at least one component carrier and for the remaining component carriers, and
    the base station verifies for each configured component carrier whether the information as to which component carrier should be activated and deactivated is correct based on the channel state information values for each component carrier in the received channel state information message.

12. A user equipment for reporting channel state information to a base station in a communication system in which a plurality of component carriers are configured for communication between the base station and the user equipment, the user equipment comprising:
  a processor adapted to calculate channel state information values for each component carrier that is activated, except for at least one activated or deactivated component carrier for which the calculation of channel state information values is not performed,
  the processor is further adapted to prepare a channel state information message,
  comprising one data field for each of the plurality of configured component carriers that is deactivated and for each of the plurality of configured component carriers that is activated, wherein the data field for said at least one activated or deactivated configured component carrier comprises predetermined channel state information values encoding the reason why the calculation of the channel state information values was not performed for said at least one activated or deactivated configured component carrier, and wherein the remaining data fields each comprises the calculated channel state information values for the associated component carriers, and
  a transmitter adapted to transmit the channel state information message to the base station,
  wherein the component carriers are respectively composed of a plurality of subbands, and
  wherein the channel state information values comprise a Modulation and Coding Scheme Index (MCSI) value for all subbands and one offset value for each of the subbands,
  wherein the MCSI value and each offset value are combined to indicate the effective MCSI value for each subband, and wherein the predetermined channel state information values for the at least one component carrier comprise an MCSI value and offset values for the subbands defined such that the effective MCSI value for at least one subband is outside a range of valid MCSI values.

13. The method according to claim 1, wherein the reason why the calculation of the channel state information values was not performed is encoded by assigning the effective MCSI value for at least one subband of the component carriers that is outside the range of valid MCSI values.

14. The method according to claim 1, wherein the range of valid MCSI values is 0 to 15.

* * * * *